(12) United States Patent
Sakai

(10) Patent No.: US 8,463,898 B2
(45) Date of Patent: Jun. 11, 2013

(54) INFORMATION COLLECTING APPARATUS, METHOD OF CONTROLLING THE INFORMATION COLLECTING APPARATUS, NETWORK APPARATUS, METHOD OF CONTROLLING THE NETWORK APPARATUS, AND STORAGE MEDIUM

(75) Inventor: Katsuya Sakai, Setagaya-ku (JP)

(73) Assignee: Canon Kabushiki Kaisha (JP)

( * ) Notice: Subject to any disclaimer, the term of this patent is extended or adjusted under 35 U.S.C. 154(b) by 393 days.

(21) Appl. No.: 12/465,272

(22) Filed: May 13, 2009

(65) Prior Publication Data
US 2009/0285115 A1 Nov. 19, 2009

(30) Foreign Application Priority Data
May 14, 2008 (JP) ................... 2008-127391

(51) Int. Cl.
G06F 15/173 (2006.01)
G06F 15/16 (2006.01)

(52) U.S. Cl.
USPC .......................................... 709/224; 709/205

(58) Field of Classification Search
USPC .............................. 709/224, 205
See application file for complete search history.

(56) References Cited

U.S. PATENT DOCUMENTS

| | | | | |
|---|---|---|---|---|
| 6,044,407 A | * | 3/2000 | Jones et al. | 709/246 |
| 6,154,778 A | * | 11/2000 | Koistinen et al. | 709/228 |
| 6,266,694 B1 | * | 7/2001 | Duguay et al. | 709/223 |
| 7,509,646 B1 | * | 3/2009 | Maw et al. | 718/105 |
| 8,005,979 B2 | * | 8/2011 | Dinker et al. | 709/238 |
| 2002/0152307 A1 | * | 10/2002 | Doyle et al. | 709/225 |
| 2005/0281566 A1 | | 12/2005 | Kaneko | |
| 2009/0003211 A1 | * | 1/2009 | Akyamac et al. | 370/235 |

FOREIGN PATENT DOCUMENTS
JP 2006-40258 A 2/2006

* cited by examiner

Primary Examiner — Kristie Shingles
(74) Attorney, Agent, or Firm — Rossi, Kimms & McDowell LLP

(57) ABSTRACT

An information collecting apparatus which is capable of reliably collecting information without troubling a user or a service person even when there is no device capable of playing the role of a server to collect information on its behalf. The apparatus collects information on network devices connected to a network. The collected information is transmitted to a server. When the apparatus cannot continue information collection, it is determined whether or not any network device is provided with the information collecting function. If any of them is provided, the apparatus instructs the device to execute the function, whereas if none of them is provided with the function, the apparatus instructs the device to transmit information on the device itself to the server.

10 Claims, 13 Drawing Sheets

FIG.8

| | COMPILED INFORMATION | | |
|---|---|---|---|
| | SPEC | COUNT CHANGE RATE | POLLING RESPONSE RATE |
| DEVICE 101 | 1 | 1.9 | 1 |
| DEVICE 102 | 1 | 5.5 | 0.95 |
| DEVICE 103 | 1 | 1.5 | 0.59 |
| DEVICE 104 | 0 | 10 | 1 |
| DEVICE 105 | 0 | 1 | 0.32 |

FIG.10

■EXAMPLE OF PRIORITY CALCULATION
PRIORITY = SPEC * ((1/COUNT CHANGE RATE * 7) + (POLLING RESPONSE RATE * 3))

DEVICE 102 = 1*((1/5.5*7)+(0.95*3))=4.12 ← SECOND PRIORITY
DEVICE 103 = 1*((1/1.5*7)+(0.59*3))=6.44 ← TOP PRIORITY
DEVICE 104 = 0*((1/10*7)+(1.0*3))=0
DEVICE 105 = 0*((1/1*7)+(0.32*3))=0

INFORMATION COLLECTING APPARATUS, METHOD OF CONTROLLING THE INFORMATION COLLECTING APPARATUS, NETWORK APPARATUS, METHOD OF CONTROLLING THE NETWORK APPARATUS, AND STORAGE MEDIUM

BACKGROUND OF THE INVENTION

1. Field of the Invention

The present invention relates to an information collecting apparatus for collecting maintenance information and the like (counter information, error log information, consumable component information, etc.) on network apparatuses connected to a network, a method of controlling the information collecting apparatus, a network apparatus, a method of controlling the network apparatus, and a storage medium storing each of programs for implementing the methods.

2. Description of the Related Art

Devices, typified by an image forming apparatus, each store a large amount of maintenance information including management data and log data for management thereof, and consumable component information. Further, in recent years, devices of the above-mentioned type have been networked, i.e. mostly connected to networks so as to be operated as network apparatuses.

In this situation, there has been proposed a system in which a user collects management information from devices (network apparatuses) on a LAN to perform centralized management of the devices. Further, a system in which pieces of information on devices are collected in a server apparatus on the Internet for centralized management has also been proposed so as to facilitate device maintenance by a service person.

Further, there have been proposed two methods of achieving the system in which pieces of information are collected in a server apparatus on the Internet. In a first method, an information collecting device collects information on a plurality of devices on the same network and collectively sends the device information to the server apparatus on the Internet, while in a second method, each device sends information on itself to the server apparatus.

There has also been proposed a technique in which in the former method, a second-priority device is provided in advance to be reserved for occurrence of a trouble with the information collecting device, and when a trouble occurs in the information collecting device, the second-priority device substitutes for the information collecting device (see e.g. Japanese Patent Laid-Open Publication No. 2006-040258).

However, a problem with the above-mentioned prior art is that a device for operating on behalf of the information collecting device as the second-priory device does not always exist, and hence when no such second-priority device which can operate on behalf of the information collecting device exists, the collection of device information cannot be continued. Further, in the prior art, even if the second-proxy device exists, it does not take over data collected so far, which can cause some omission in collected information.

SUMMARY OF THE INVENTION

The present invention provides an information collecting apparatus which is capable of reliably collecting information without troubling a user or a service person even when there is no device capable of playing the role of a server to collect information on its behalf, to thereby improve user friendliness, a method of controlling the information collecting apparatus, a network apparatus and a method of controlling the same, and a storage medium storing programs for implementing the methods.

In a first aspect of the-present invention, there is provided an information collecting apparatus comprising a collecting unit configured to collect apparatus information on a network apparatus connected to a network, a transmission unit configured to transmit the apparatus information collected by the collecting unit to an information processing apparatus on the network, a determination unit configured to be operable when the information collecting apparatus cannot continue collection of apparatus information by the collecting unit, to determine whether or not the network apparatus is provided with a function for collecting apparatus information, and a transfer unit configured to be operable when it is determined by the determination unit that the network apparatus is provided with the function, to instruct the network apparatus to execute the function, and when it is determined that the network apparatus is not provided with the function, to instruct the network apparatus to transmit apparatus information on the network apparatus itself to the information processing apparatus.

In a second aspect of the present invention, there is provided a network apparatus connected to a network, comprising a reception unit configured to receive a transmission request for transmitting apparatus information on the network apparatus, from an information collecting apparatus connected to the network, a transmission unit configured to transmit the apparatus information on the network apparatus to the information collecting apparatus in response to the transmission request received by the reception unit, a second reception unit configured to receive, from the information collecting apparatus connected to the network, an instruction for transmitting the apparatus information on the network apparatus to an information processing apparatus connected to the network, and a second transmission unit configured to transmit the apparatus information on the network apparatus to the information processing apparatus in response to the instruction received by the second reception unit.

In a third aspect of the present invention, there is provided a method of controlling an information collecting apparatus, comprising collecting apparatus information on a network apparatus connected to a network, transmitting the apparatus information collected by the collecting to an information processing apparatus on the network, determining, when the information collecting apparatus cannot continue collection of apparatus information by the collecting, whether or not the network apparatus is provided with a function for collecting apparatus information, and instructing the network apparatus to execute the function when it is determined by the determining that the network apparatus is provided with the function, and to transmit apparatus information on the network apparatus itself to the information processing apparatus when it is determined by the determining that the network apparatus is not provided with the function.

In a fourth aspect of the present invention, there is provided a method of controlling a network apparatus connected to a network, comprising receiving a transmission request for transmitting apparatus information on the network apparatus, from an information collecting apparatus connected to the network, transmitting the apparatus information on the network apparatus to the information collecting apparatus in response to the transmission request received by the receiving, receiving, from the information collecting apparatus connected to the network, an instruction for transmitting the apparatus information on the network apparatus to an information processing apparatus connected to the network, and transmitting the apparatus information on the network apparatus to the information processing apparatus in response to the received instruction.

In a fifth aspect of the present invention, there is provided a computer-readable storage medium storing a program for causing a computer to execute a method of controlling an information collecting apparatus, wherein the method comprises collecting apparatus information on a network apparatus connected to a network, transmitting the apparatus information collected by the collecting to an information processing apparatus on the network, determining, when the information collecting apparatus cannot continue collection of apparatus information by the collecting, whether or not the network apparatus is provided with a function for collecting apparatus information, and instructing the network apparatus to execute the function when it is determined by the determining that the network apparatus is provided with the function, and to transmit apparatus information on the network apparatus itself to the information processing apparatus when it is determined by the determining that the network apparatus is not provided with the function.

In a sixth aspect of the present invention, there is provided a computer-readable storage medium storing a program for causing a computer to execute a method of controlling a network apparatus connected to a network, wherein the method comprises receiving a transmission request for transmitting apparatus information on the network apparatus, from an information collecting apparatus connected to the network, transmitting the apparatus information on the network apparatus to the information collecting apparatus in response to the transmission request received by the receiving, receiving, from the information collecting apparatus connected to the network, an instruction for transmitting the apparatus information on the network apparatus to an information processing apparatus connected to the network, and transmitting the apparatus information on the network apparatus to the information processing apparatus in response to the received instruction.

According to the information collecting apparatus of the present invention, it is possible to reliably collect information without troubling a user or a service person even when there is no device capable of playing the role of a server to collect information on its behalf, to thereby improve user friendliness The features and advantages of the invention will become more apparent from the following detailed description taken in conjunction with the accompanying drawings.

BRIEF DESCRIPTION OF THE DRAWINGS

FIG. 8 is a diagram showing an example of information compiled in a step in FIG. 7.

FIG. 10 is a diagram useful in explaining an example of a priority calculating method employed in a step in FIG. 9.

DETAILED DESCRIPTION OF THE EMBODIMENTS

The present invention will now be described in detail below with reference to the accompanying drawings showing an embodiment thereof.

Figure 1:
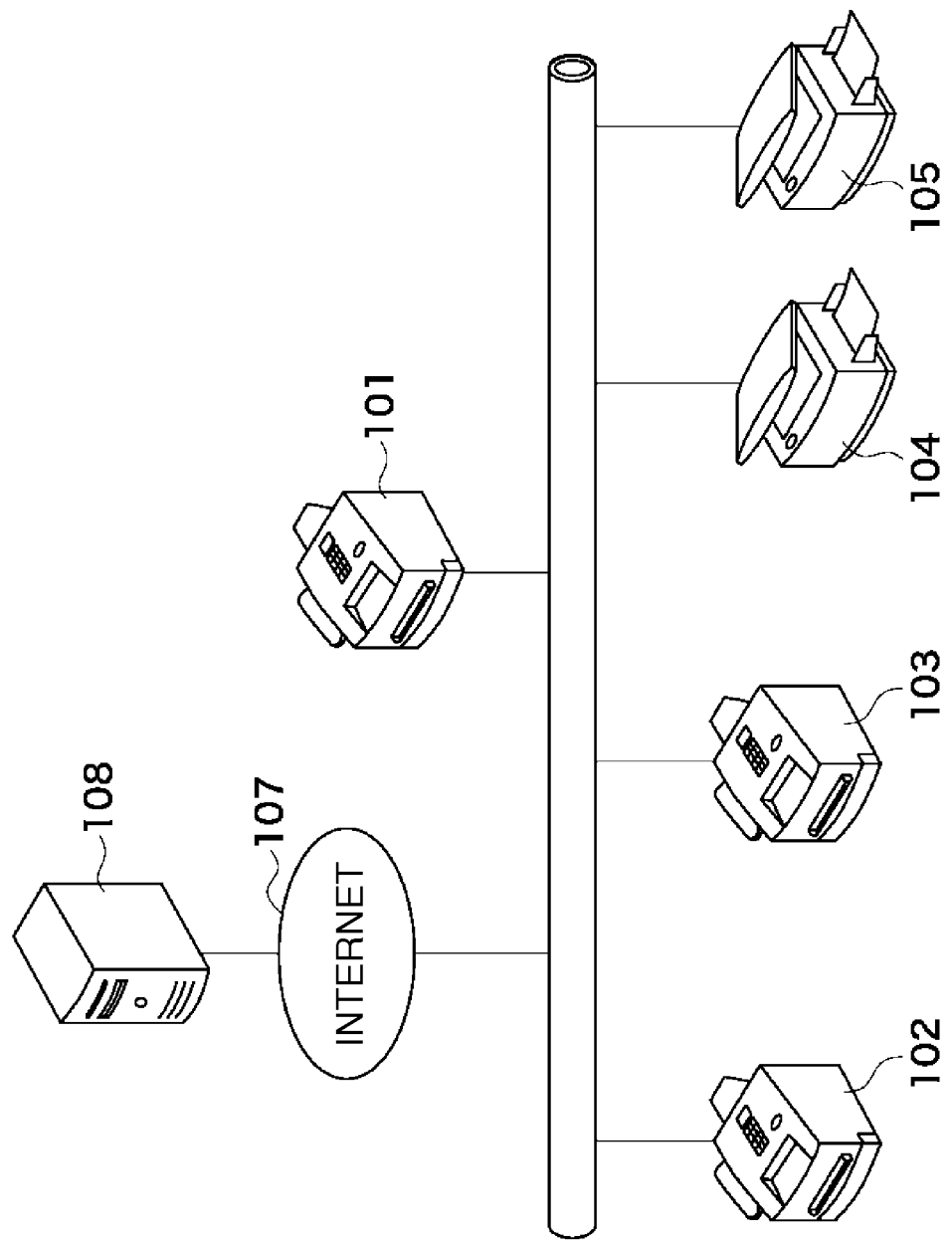
FIG. 1 is a diagram of an image forming apparatus-monitoring system as an information collecting system including an information collecting apparatus according to an embodiment of the present invention.

FIG. 1 is a diagram of an image forming apparatus-monitoring system as an information collecting system including an information collecting apparatus according to the embodiment of the present invention.

As shown in FIG. 1, the image forming apparatus-monitoring system is constructed by connecting image forming apparatuses 101 to 105 to a LAN 106 and interconnecting a server apparatus 108 and the image forming apparatuses 101 to 105 via the Internet 107. In short, the image forming apparatuses 101 to 105 are examples of a network apparatus the present invention which is connected to a network in. Further, the server apparatus 108 is an example of an information processing apparatus in the present invention.

The image forming apparatus 101 monitors the status of each of the image forming apparatuses 102 to 105 and the image forming apparatus 101 itself, and collects maintenance information including counter information, error log information, and consumable component information. The image forming apparatus 101 sends the collected information to the server apparatus 108 in predetermined timing.

The server apparatus 108 receives maintenance information from the image forming apparatus 101 and other client apparatuses (not shown), and manages the information in a centralized manner.

It is assumed that each of the image forming apparatuses 102 and 103 is provided with the same functions as those of the image forming apparatus 101. More specifically, each of the image forming apparatuses 102 and 103 is provided with a software module for collecting information from other image forming apparatuses. Further, it is assumed that each of the image forming apparatuses 104 and 105 is not provided with a software module for collecting information from other image forming apparatuses, but is capable of sending information on itself directly to the server apparatus 108.

In short, each of the image forming apparatuses 101 to 103 can function as an information collecting apparatus for collecting apparatus information on network apparatuses interconnected via the network.

Figure 2:
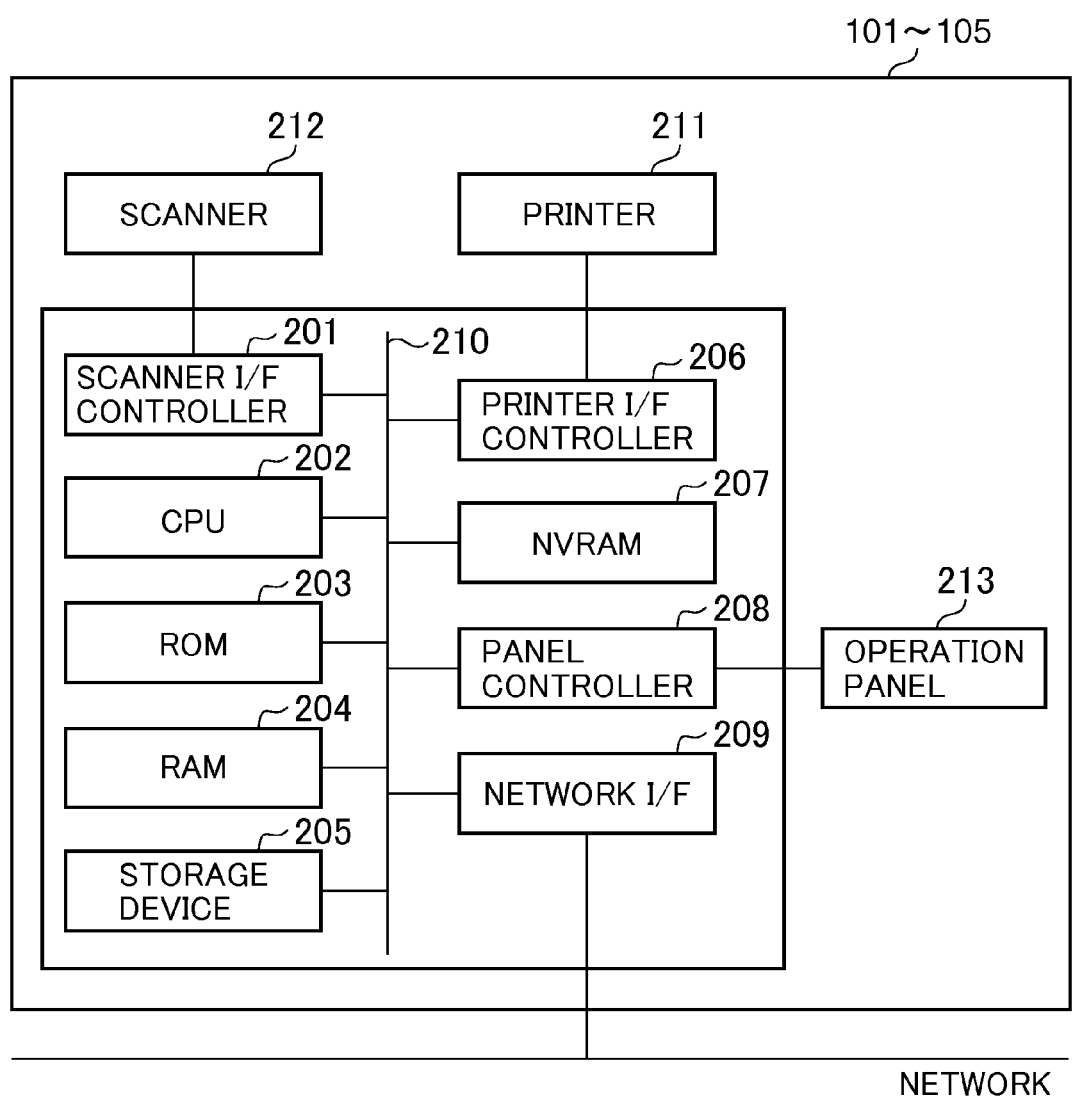
FIG. 2 is a block diagram showing a hardware configuration common to a plurality of image forming apparatuses appearing in FIG. 1.

FIG. 2 is a block diagram showing a hardware configuration common to the image forming apparatuses 101 to 105 appearing in FIG. 1.

A scanner interface controller 201 of each of the image forming apparatuses 101 to 105 controls a scanner 212. A CPU 202 executes software programs for the image forming apparatus to thereby control the overall operation of the apparatus.

A ROM (Read Only Memory) 203 stores a boot program, fixed parameters, etc. for the apparatus. A RAM (Random Access Memory) 204 is used by the CPU 202 so as to temporarily store data and load software programs for control of the apparatus.

A storage device 205 is implemented e.g. by a hard disk drive or a flash memory. The storage device 205 is used to store various kinds of data. Data to be collected is also stored in the storage device 205. A printer interface controller 206 controls a printer 211.

A NVRAM (Nonvolatile RAM) 207 stores various settings for the printer. A panel controller 208 controls an operation panel 213 for displaying various kinds of information and receiving input of instructions from the user.

A network interface controller 209 controls transmission and reception of data to and from the network (LAN 106). Connected to a bus (system bus) 210 are the scanner interface controller 201, the CPU 202, the ROM 203, the RAM 204, the storage device 205, the printer interface controller 206, the NVRAM 207, the panel controller 208, and the network interface controller 209. Control signals from the CPU 202 and data signals from the various devices are transmitted or received via the bus 210.

Although in FIG. 2, the copying machine provided with the scanner and the printer is illustrated as an example of the image forming apparatus, the image forming apparatus may be implemented by a device other than the copying machine. That is, it may be implemented by a printer, a scanner, a facsimile machine, or a multi-function peripheral, for example.

Figure 3:
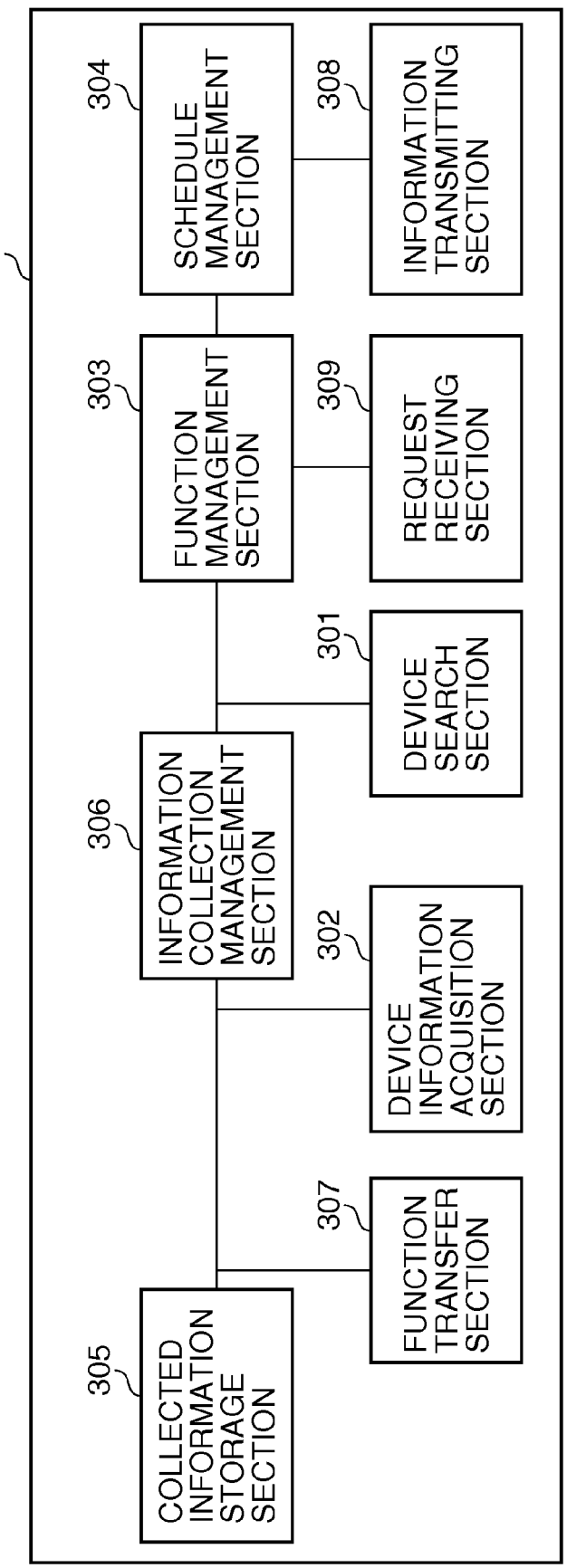
FIG. 3 is a block diagram showing a software configuration of each of image forming apparatuses, appearing in FIG. 1, provided with both an information collecting function and an information transmitting function.

FIG. 3 is a block diagram showing a software configuration of each of the image forming apparatuses 101 to 103 appearing in FIG. 1, which has both an information collecting function and an information transmitting function.

Each of the image forming apparatuses 101 to 103 has an information collecting functional block and an information transmitting functional block described hereafter. More specifically, the functional blocks are comprised of a device search section 301, a device information acquisition section 302, a function management section 303, a schedule management section 304, a collected information storage section 305, an information collection management section 306, a function transfer section 307, an information transmitting section 308, and a request receiving section 309.

The device search section 301 searches for devices to be managed (network apparatuses; image forming apparatuses) which are connected to the network.

The device information acquisition section 302 acquires device information (a list of available functions, a list of enabled functions, various kinds of maintenance information including error log information and consumable component information, etc.) from each of the other devices (apparatuses). The device information acquisition section 302 is an example of a collecting unit in the present invention, which is configured to collect apparatus information on network apparatuses connected to the network, which are found by the device search section 301.

The function management section 303 enables or disables available functions of the apparatus to which it belongs. A schedule management section 304 manages a timing schedule for acquiring information from each of the other devices (apparatuses) and a timing schedule for transmitting information to the server apparatus 108.

The collected information storage section 305 cumulatively stores information collected from the other devices (apparatuses). The information collection management section 306 manages devices (apparatuses) from which to collect information, compiles collected information on a device-by-device basis to thereby calculate the availability and the like of each of the devices, and determines the priorities of the respective devices in suitability for causing the information collecting function to operate.

The function transfer section 307 transfers the information collecting function to another device (apparatus) at the shutdown of the image forming apparatus. The function transfer section 307 is an example of a transfer unit in the present invention, which is configured to be operable when the network apparatus to which the function transfer unit belongs is to be shut down, to request another network apparatus to take over the information collecting function of a collecting unit, or to send apparatus information on its own.

Specifically, the function transfer section 307 requests another network apparatus (the image forming apparatus 102 or 103 in the case of the image forming apparatus 101 having the function transfer section 307) equipped with the information collecting function but not having the same enabled to take over the information collecting function of the network apparatus (the image forming apparatus 101 in the above-mentioned example) by enabling the information collecting function of its own.

Further, the function transfer section 307 requests another network apparatus (the image forming apparatus 104 or 105) which does not have the information collecting function, but is capable of sending apparatus information on the network apparatus itself, to send apparatus information on themselves.

The information collection management section 306 serves as a priority determination unit configured to determine the priorities of the respective network apparatuses before the function transfer section 307 requests another network apparatus having the information collecting function to take over the information collecting function.

The priority determination unit calculates a priority index using at least one of the frequency of process execution by each of the other network apparatuses and the response rate to requests for information collection, as a parameter.

The information transmitting section 308 sends information cumulatively stored in the collected information storage section 305 to the server apparatus 108, or sends information on the device (apparatus) to which the information transmitting section 308 belongs in response to a request from another device. The request receiving section 309 receives an information transmission request or the information collecting function takeover request from another device and performs processing associated therewith.

Figure 4:
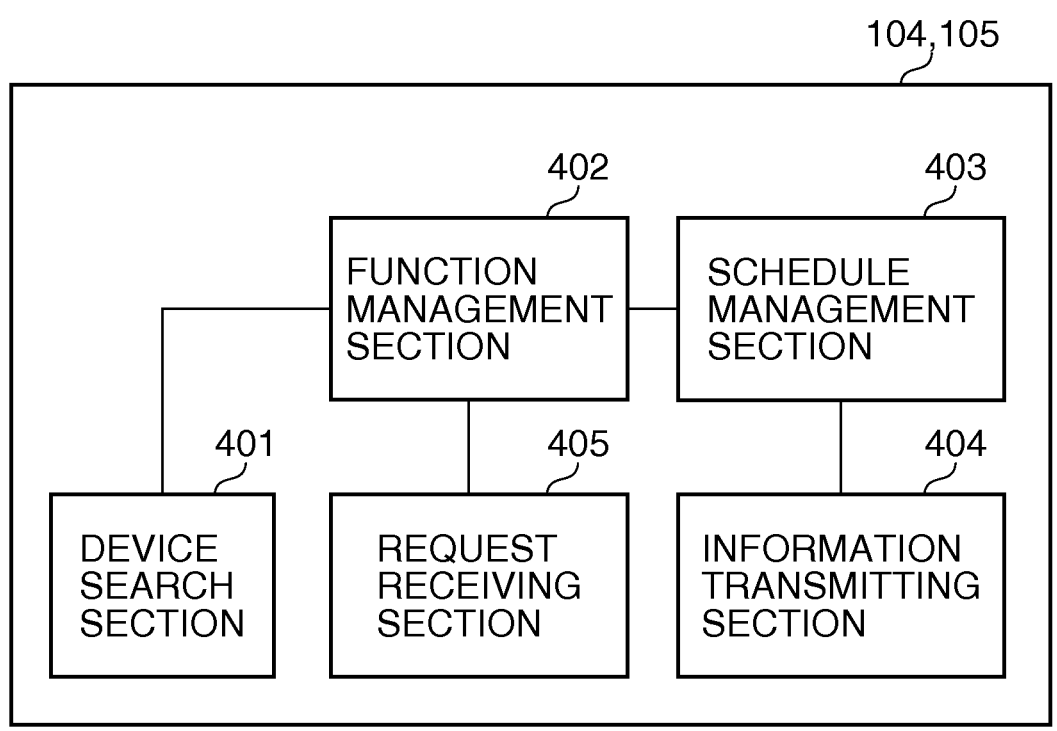
FIG. 4 is a block diagram showing a software configuration for realizing the information transmitting function of each of image forming apparatuses which do not have the information collecting function.

FIG. 4 is a block diagram showing a software configuration for realizing the information transmitting function of each of the image forming apparatuses 104 and 105 appearing in FIG. 1.

The information transmitting function of the image forming apparatus 104 (105) is comprised of a device search section 401, a function management section 402, a schedule management section 403, an information transmitting section 404, and a request receiving section 405.

The device search section 401 searches for devices to be managed which are connected to the network. The function management section 402 enables or disables available functions of the image forming apparatus 104 to which it belongs. The schedule management section 403 manages a timing schedule for transmitting information to the server apparatus 108.

The information transmitting section 404 sends maintenance information on the image forming apparatus 104 (105) to which it belongs to the server apparatus 108 in timing scheduled by the schedule management section 403 (serving as a second transmission unit of a network apparatus connected to a network, in the present invention). Further, the information transmitting section 404 sends device information on the image forming apparatus 104 (105) to another device (apparatus) in response to a request from the same (serving as a transmission unit of the network apparatus in the present invention). The request receiving section 405 performs processing in response to an information transmission request, an information transmitting function-enabling request, or an information transmitting function-disabling request received from another device (apparatus) (serving as a second transmission unit of the network apparatus in the present invention).

The request receiving section 405 receives from an information collecting apparatus (one of the image forming apparatuses 101 to 103) a request for transmitting apparatus information on the image forming apparatus 104 (105) (serving as a transmission unit of the network apparatus in the present invention).

Next, processes executed at the start of an image forming apparatus will be described with reference to FIGS. 5 and 6.

Figure 5:
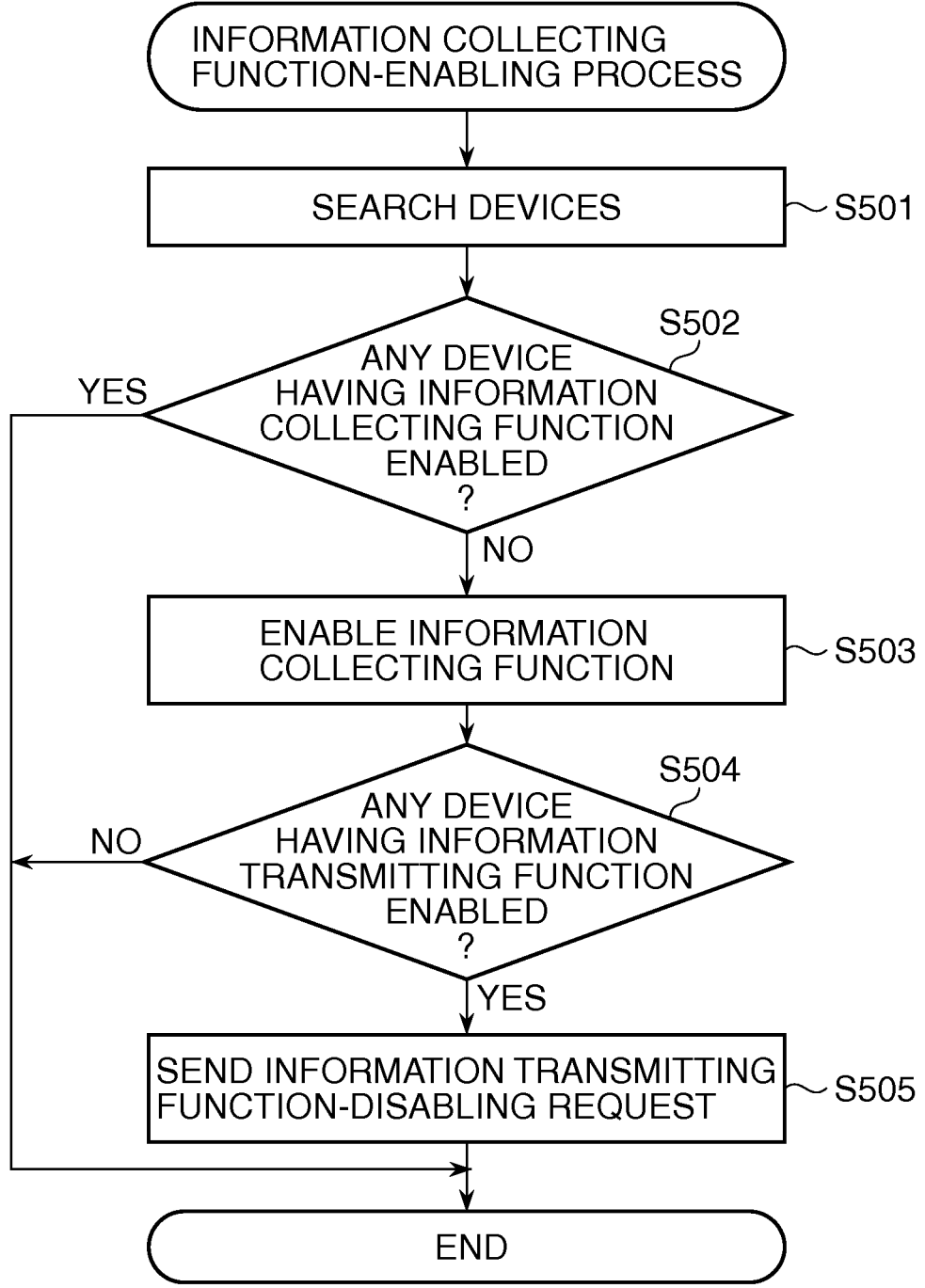
FIG. 5 is a flowchart of an information collecting function-enabling process executed by the FIG. 3 image forming apparatus having both the information collecting function and the information transmitting function, at the start of the apparatus.

FIG. 5 is a flowchart of an information collecting function-enabling process executed by each of the image forming apparatuses 101 to 103 at the start of the apparatus. The following description will be given using the image forming apparatus 101 as a representative of the image forming apparatuses 101 to 103.

When the power of the image forming apparatus 101 is turned on, first in a step S501, the image forming apparatus 101 searches for devices to be managed (image forming apparatuses) based on a device list. Information of the device list is input by a service person when each device (apparatus) is installed, or is received from the server apparatus 108 and stored in the device (apparatus), and it is assumed that all the devices (apparatuses) to be managed store the device list.

Then, it is determined in a step S502 whether or not there is a device having its information collecting function enabled. If it is determined that there is a device having its information collecting function enabled, the present process is terminated.

If it is determined in the step S502 that there is no device having its information collecting function enabled, the process proceeds to a step S503, wherein the image forming apparatus 101 enables its own information collecting function.

Then, the process proceeds to a step S504, wherein it is determined whether or not there is a device having its information transmitting function enabled on the network. If it is determined that there is no device having its information transmitting function enabled, the present process is terminated.

If it is determined in the step S504 that there is at least one device having its information transmitting function enabled, the process proceeds to a step S505, wherein the image forming apparatus 101 sends an information transmitting function-disabling request to each device having its information transmitting function enabled, followed by terminating the present process.

Figure 6:
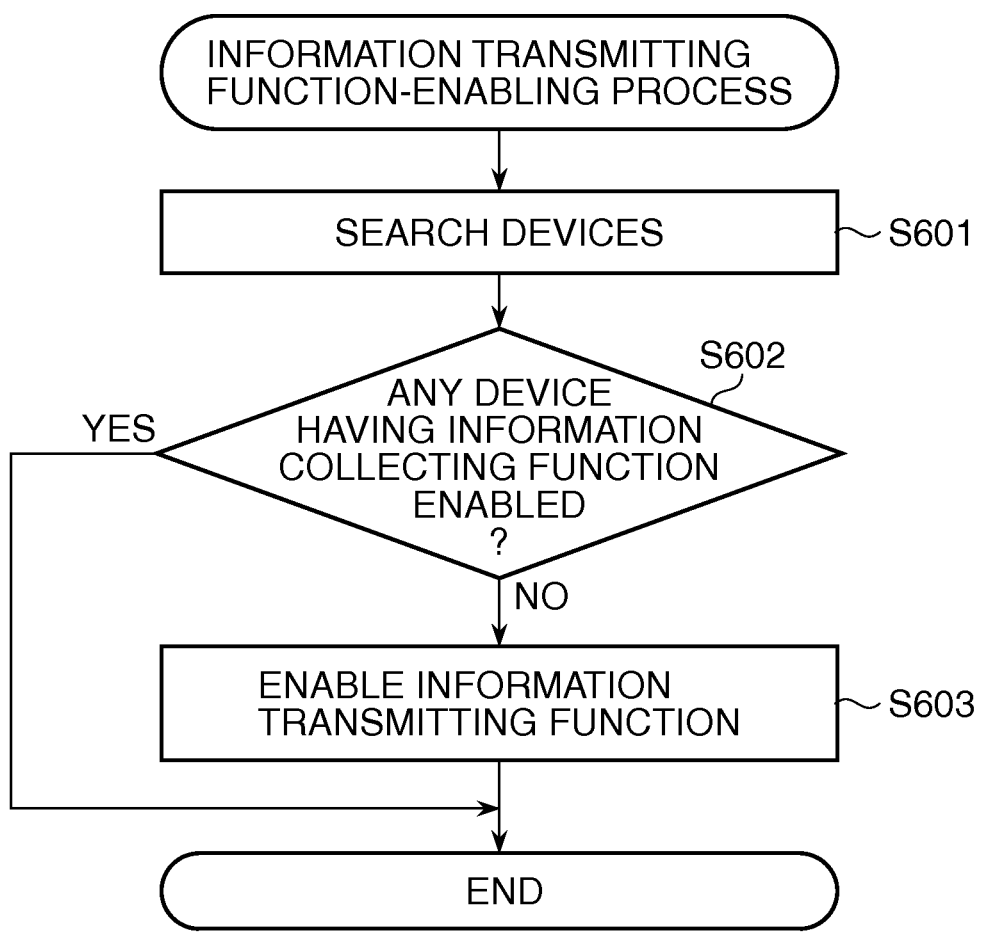
FIG. 6 is a flowchart of an information transmitting function-enabling process executed by the FIG. 4 image forming apparatus which does not have the information collecting function, at the start of the apparatus.

FIG. 6 is a flowchart of an information transmitting function-enabling process executed by each of the FIG. 4 image forming apparatuses 104 and 105 at the start of the apparatus. The following description will be given using the image forming apparatus 104 as a representative of the image forming apparatuses 104 and 105.

When the power of the image forming apparatus 104 is turned on, first in a step S601, the image forming apparatus 104 searches for devices (apparatuses) to be managed, based on the device list.

Then, it is determined in a step S602 whether or not there is a device having its information collecting function enabled. If it is determined that there is a device having its information collecting function enabled, the present process is terminated.

If it is determined in the step S602 that there is no device which has its information collecting function enabled, the process proceeds to a step S603. In the step S603, the image forming apparatus 104 enables its own information transmitting function, followed by terminating the present process.

The above-described processes make it possible to use the information collecting function for centralized management when at least one device has the information collecting function, and enable each of the devices (apparatuses) to transmit information by itself to the server apparatus 108 when there is no device having the information collecting function enabled.

Next, an information collecting process executed in a case where the information collecting function is enabled in one of the image forming apparatuses 101 to 103 will be described with reference to FIGS. 7 and 8.

Figure 7:
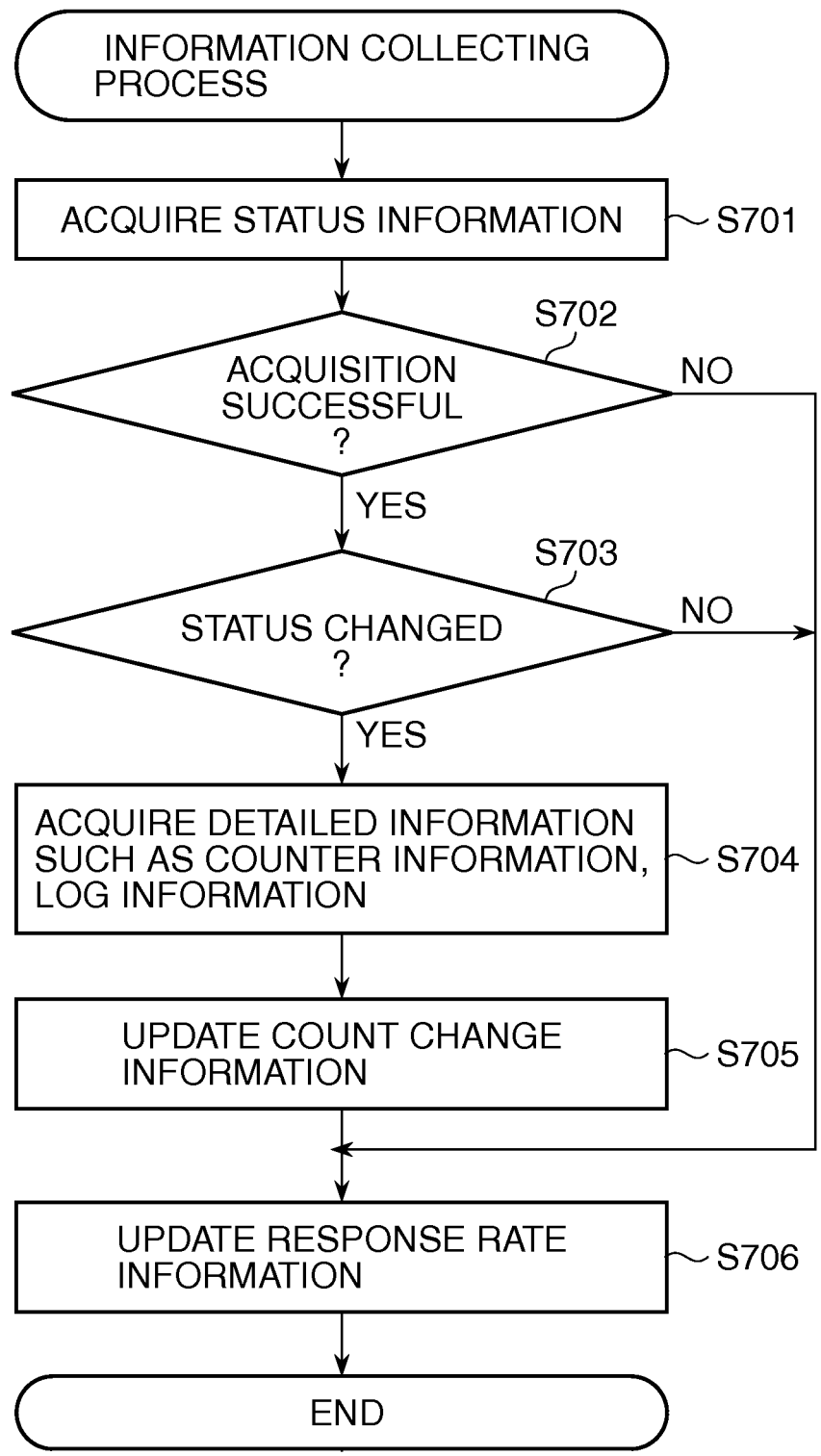
FIG. 7 is a flowchart of an information collecting process executed by the FIG. 3 image forming apparatus.

FIG. 7 is a flowchart of an information collecting process executed by one of the image forming apparatuses 101 to 103. As in the case of the FIG. 5 flowchart, the following description will be given using the image forming apparatus 101 as a representative of the image forming apparatuses 101 to 103.

The present process is executed in timing scheduled by the schedule management section 304.

When it is a scheduled time to collect information, first in a step S701, the image forming apparatus 101 attempts to acquire status information from devices (apparatuses) connected to the network. Then, it is determined in a step S702 whether or not the information acquisition is successful. If the information acquisition is successful, the process proceeds to a step S703.

In the step S703, the acquired status information is compared with status information already cumulatively stored, whereby it is determined whether or not any of the devices (apparatuses) is in a status changed from the corresponding status on which information was acquired on the immediately preceding occasion. If it is determined in the step S703 that any of the devices (apparatuses) is in a changed status, the process proceeds to a step S704.

In the step S704, various kinds of counter values (e.g. a component count, a copy count, etc.), log information (e.g. a jam log, a warning log, and an error log), and specification information are acquired from the device (apparatus). Then, the process proceeds to a step S705, wherein count change information is updated. Then, the process proceeds to a step S706, and polling response rate information is updated, followed by terminating the present process.

On the other hand, if it is determined in the step S702 that the information acquisition is unsuccessful, or if it is determined in the step S703 that there is no device (apparatus) in a changed status, the process directly proceeds to the step S706, wherein the polling response rate information is updated, followed by terminating the present process.

FIG. 8 is a diagram showing the information compiled in the steps S705 and S706 in FIG. 7.

A spec (specification) 801 is information indicative of whether or not the device is provided with the information collecting function. A device having the information collecting function is indicated by a value of 1 set to the spec 801, whereas a device having no information collecting function is indicated by a value of 0 set to the same.

A count change rate 802 is information indicative of the frequency of job execution by an associated device. This rate is calculated e.g. by the equation of "new count change rate=old count change rate×0.9+(last per-minute increment of count+1)×0.1". As this value is larger, it indicates that an associated device is more often used by users, and therefore it is desirable to operate the information collecting function using a device having a lower value of the count change rate.

A polling response rate 803 is information indicative of the availability of an associated device. This rate is calculated e.g. by the equation of "new polling response rate=old polling response rate×0.95+response×0.05" (response=1 when it is determined in the step S702 that the information acquisition is successful, and response=0 when it is determined in the step S702 that the information acquisition is unsuccessful). A device having a lower value of the polling response rate is less likely to have its power supply turned off, and therefore it is preferable to operate the information collecting function using a device having a lower value of the polling response rate.

Next, a process executed before turn-off of the power of each of the image forming apparatuses 101 to 103 will be described with reference to FIGS. 9 and 10. The following description will be given using the image forming apparatus 101 as a representative of the image forming apparatuses 101 to 103.

Figure 9:
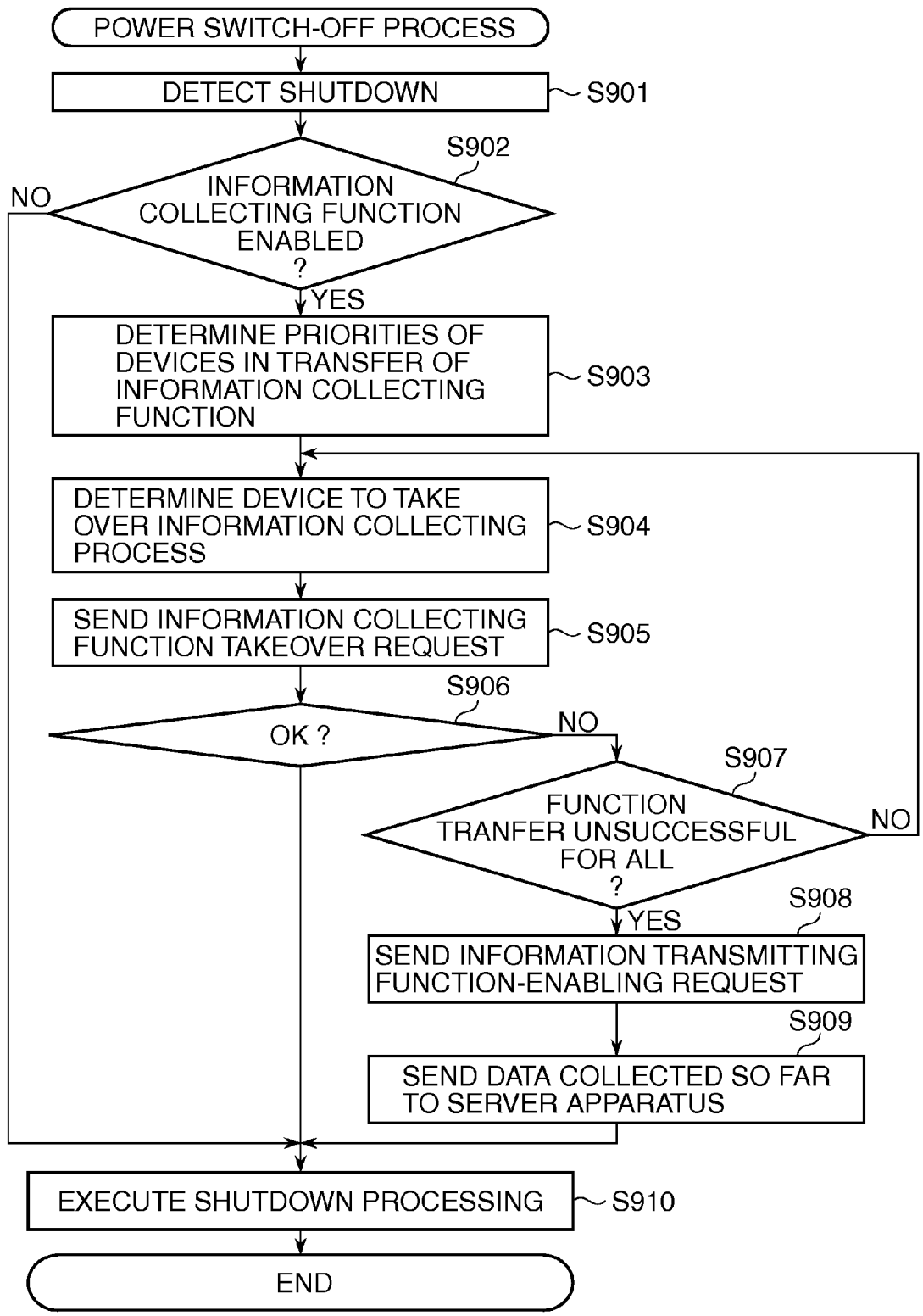
FIG. 9 is a flowchart of a power switch-off process executed when a power switch of the FIG. 2 image forming apparatus is turned off.

FIG. 9 is a flowchart of a power switch-off process executed when a power switch, not shown, of the image forming apparatus 101 is turned off.

When the power switch is turned off, a shutdown request is detected in a step S901. Then, the process proceeds to a step S902, wherein the image forming apparatus 101 determines whether or not its own information collecting function is in an enabled state.

If it is determined in the step S902 that the information collecting function is not in an enabled state, the process proceeds to a step S910, wherein shutdown processing is executed, followed by terminating the present process. If it is determined in the step S902 that the information collecting function is in an enabled state, the process proceeds to a step S903.

In the step S903, priorities of devices which are to be requested to take over the information collecting function are determined based on the compiled information shown in FIG. 8.

FIG. 10 is a diagram useful in explaining an example of a priority calculating method employed in the step 903 in FIG. 9.

In the present example, each priority is calculated by weighting the count change rate and the polling response rate of each device. When the method is applied to the case shown in FIG. 8, a top priority is given to the device (image forming apparatus) 103, and a second priority is given to the device (image forming apparatus) 102.

When the priorities are determined in the step S903, the process proceeds to the following step S904. In the step S904, a device given the top priority is selected, and the process proceeds to a step S905.

In the step S905, the information collecting function takeover request is sent to the device selected in the step S904, together with configuration information required for information collection, information collected so far, and schedule information.

Then, the process proceeds to a step S906, wherein it is determined whether or not the takeover request has been accepted. If the takeover request has been accepted, the process proceeds to the step S910, and the shutdown processing is executed, followed by terminating the present process. If it is determined in the step S906 that the transfer of the information collecting function so as to cause the information collecting function to be taken over is unsuccessful, the process proceeds to a step S907.

In the step S907, it is determined whether or not the transfer of the information collecting function has been unsuccessfully carried out for all of the devices provided with the information collecting function (though not enabled). If the transfer of the information collecting function has not been unsuccessfully carried out for all of the devices provided with the information collecting function, the process returns to the step S904, wherein a device given a second priority is selected as a device to take over the information collecting function, i.e. a device to which the information collecting function is to be transferred.

If it is determined in the step S907 that the transfer of the information collecting function has been unsuccessfully carried out for all of the devices provided with the information collecting function, the process proceeds to a step S908. In the step S908, an information transmitting function-enabling request is sent to devices in which the information collecting function is not in operation.

For example, when the device (image forming apparatus) 101 attempts to transfer the information collecting function to the devices 103 and 102 in the situation shown in FIG. 10 and the attempt fails, the information transmitting function-enabling request is sent to the devices 104 and 105.

Then, the process proceeds to a step S909, wherein data collected so far is sent to the server 108. Thereafter, shutdown processing is executed in the step S910, followed by terminating the present process.

Next, request receiving processes executed when image forming apparatuses of the above-described two types receive respective requests will be described with reference to FIGS. 11 and 12.

Figure 11:
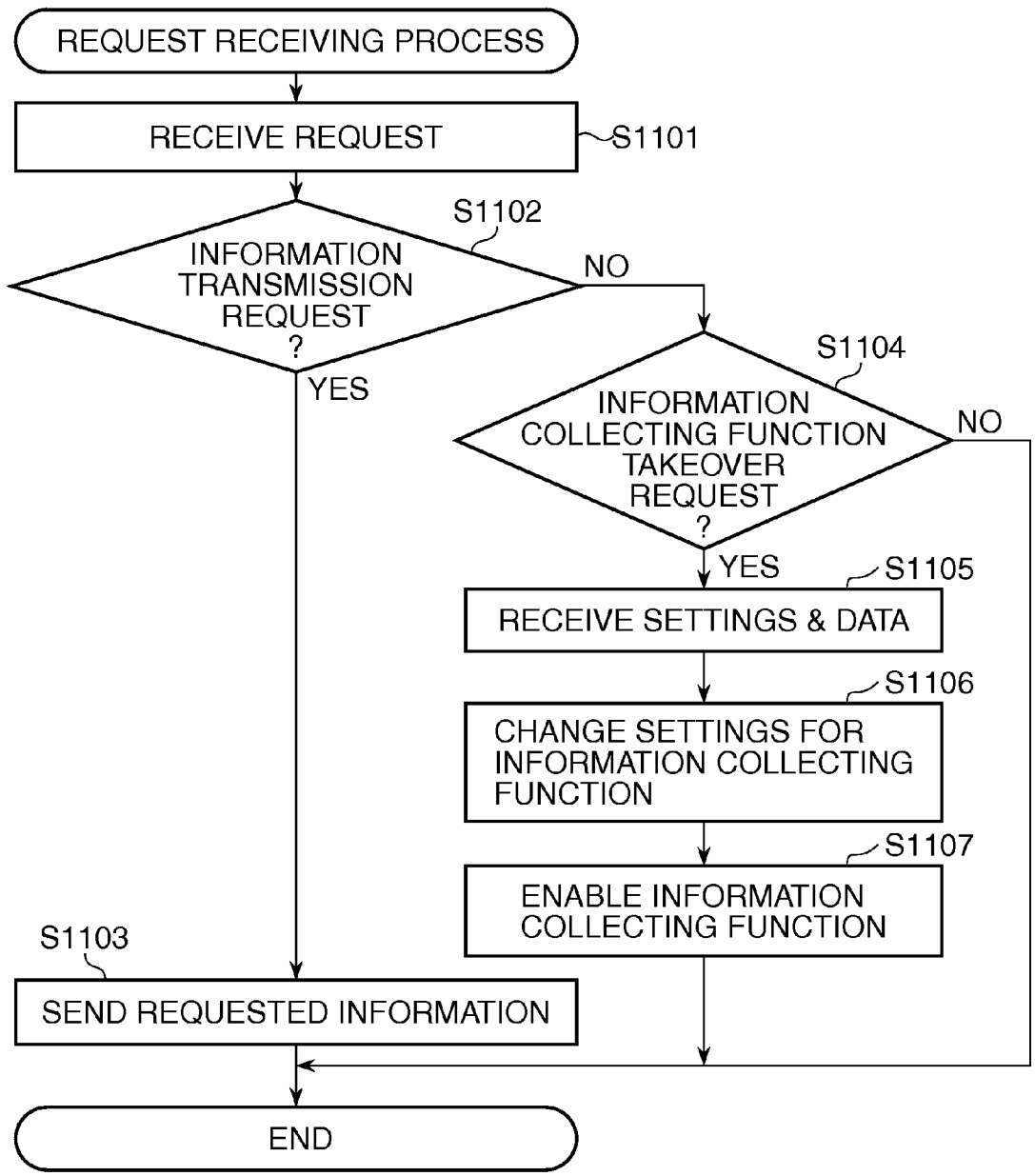
FIG. 11 is a flowchart of a request receiving process executed when the FIG. 3 image forming apparatus has received a request.

FIG. 11 is a flowchart of a request receiving process executed by each of the image forming apparatuses 101 to 103 when the image forming apparatus has received a request.

First, when a request is received in a step S1101, the process proceeds to a step S1102, wherein it is determined whether or not the received request is an information transmission request. If the received request is an information transmission request, the process proceeds to a step S1103. In the step S1103, requested information is transmitted (sent as a response) to a requesting device (apparatus), followed by terminating the present process.

On the other hand, if it is determined in the step S1102 that the received request is not an information transmission request, the process proceeds to a step S1104. In the step S1104, it is determined whether or not the received request is an information collecting function takeover request. If the received request is not an information collecting function takeover request, the present process is terminated.

On the other hand, if it is determined that the received request is an information collecting function takeover request, the process proceeds to a step S1105, wherein configuration information (a proxy setting, a server address, schedule information, etc.) required for an operation of the information collecting function, and information collected so far are received from the requesting device (apparatus).

Then, the process proceeds to a step S1106, wherein settings of the device are changed based on the configuration information received in the step S1105. Then, the process proceeds to a step S1107, wherein the information collecting function of its own is enabled, followed by terminating the present process.

Figure 12:
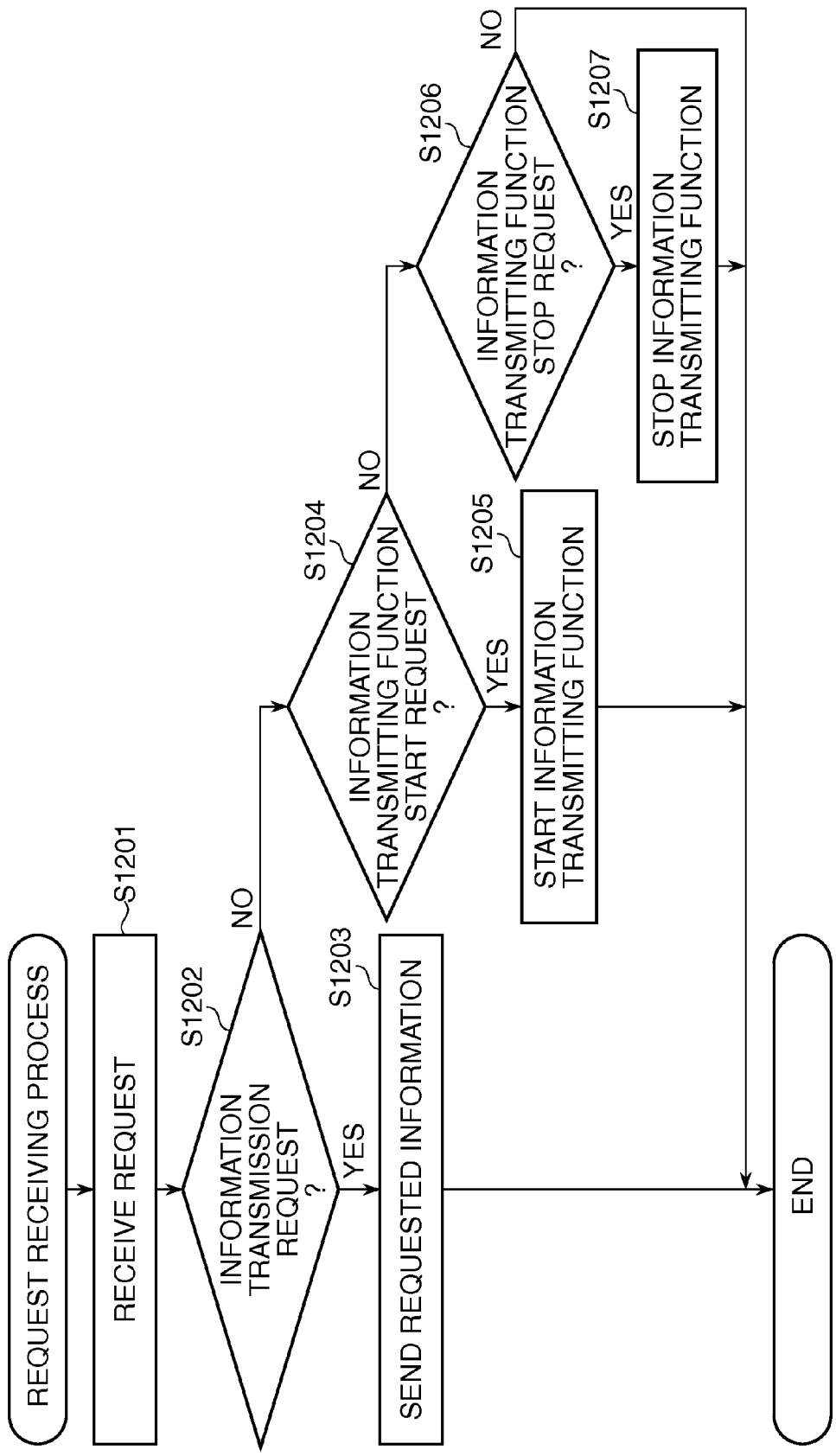
FIG. 12 is a flowchart of a request receiving process executed when the FIG. 4 image forming apparatus has received a request.

FIG. 12 is a flowchart of a request receiving process executed by each of the image forming apparatuses 104 and 105, shown in FIG. 4, when the image forming apparatus receives a request.

First, when a request is received in a step S1201, the process proceeds to a step S1202, wherein it is determined whether or not the received request is an information transmission request. If the received request is an information transmission request, the process proceeds to a step S1203. In the step S1203, requested information is transmitted (sent as a response) to a requesting device (apparatus), followed by terminating the present process.

On the other hand, if it is determined in the step S1202 that the received request is not an information transmission request, the process proceeds to a step S1204. In the step S1204, it is determined whether or not the received request is an information transmitting function start request. If the received request is an information transmitting function start request, the process proceeds to a step S1205, wherein the information transmitting function of its own is enabled, followed by terminating the present process.

If it is determined in the step S1204 that the received request is not an information transmitting function start request, the process proceeds to a step S1206, wherein it is determined whether or not the received request is an information transmitting function stop request.

If the received request is not an information transmitting function stop request, the present process is immediately terminated, whereas if the received request is an information transmitting function stop request, the process proceeds to a step S1207, wherein the information transmitting function of its own is disabled (stopped), followed by terminating the present process.

Next, an information transmitting process executed by an image forming apparatus for transmission of information will be described with reference to FIG. 13.

Figure 13:
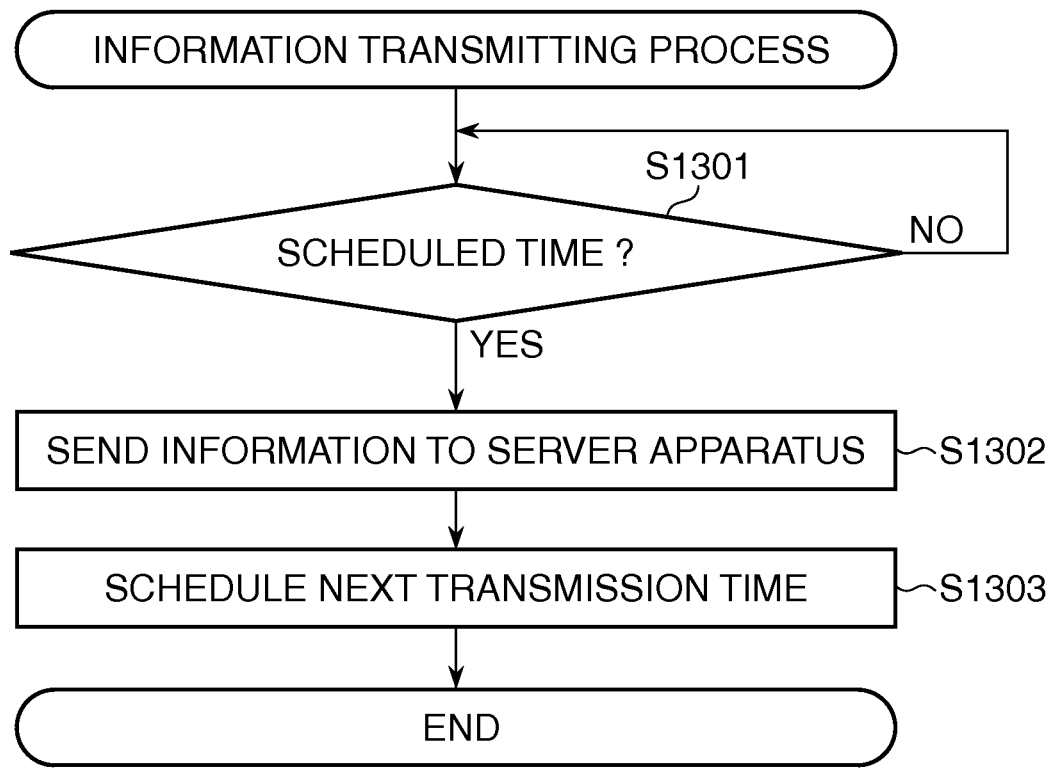
FIG. 13 is a flowchart of an information transmitting process for transmitting information to a server apparatus, which is executed in a case where the information collecting function or the information transmitting function of the FIG. 2 image forming apparatus is enabled.

FIG. 13 is a flowchart of the information transmitting process for transmitting information to the server apparatus, which is executed by each of the image forming apparatuses in a case where the information collecting function or the information transmitting function of the image forming apparatus is enabled.

First, it is determined in a step S1301 whether or not it is time scheduled by the schedule management section 304 or 403. If it is not the scheduled time yet, the process returns to the step S1301, whereas if it is the scheduled time, the process proceeds to a step S1302.

In the step S1302, information is sent to the server apparatus 108. A device having its information collecting function enabled sends collected information to the server apparatus 108, while a device having its information transmitting function enabled sends information on the device itself at the present time to the server apparatus 108. Then, the process proceeds to a step S1303, wherein a next transmission time is scheduled, followed by terminating the present process.

As described above, following an instruction from a device of which the information collecting function is enabled for operation, another device has its information collecting function enabled to take over the information collecting function, or when there is no device which is to take over the information collecting function, other devices which are not provided with the information collecting function have their information transmitting function enabled, whereby it is possible to reliably send maintenance information to the server apparatus 108.

Although in the present embodiment, information is collected from image forming apparatuses, this is not limitative, but the present invention can also be applied to any kinds of network devices (apparatuses), such as personal computers and server apparatuses.

Further, although in the present embodiment, the image forming apparatus 104 (105) actively searches for a device of which the information collecting function is enabled, at the start of the apparatus, this is not limitative, but the image forming apparatus 104 (105) may detect that no regular information transmission request is received from an information collecting device, to thereby determine that there is no device having the information collecting function enabled.

Further, although in the present embodiment, each of the devices to be managed stores the device list and performs a device search at the start of the apparatus, based on the device list, SNMP broadcast may be used to search for a device of which the information collecting function is enabled.

Furthermore, although in the present embodiment, priorities are determined based on three kinds of information, i.e. the specification information, the count change rate information, and the polling response rate information, this is not limitative, but other indicators, such as latest CPU occupancy, may be used.

What is more, although the specification information (spec 801) is provided as information of a two-valued variable indicating whether or not the information collecting function is operable, i.e. whether or not the information collecting function is at least provided irrespective of whether it is enabled, more detailed ranks may be set e.g. according to CPU performance and hard disk capacity, and weighted for determination of the aforementioned priorities.

It is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2008-127391 filed May 14, 2008, which is hereby incorporated by reference herein in its entirety.

What is claimed is:

1. An information collecting apparatus comprising:
   a collecting unit configured to execute a collecting process of collecting maintenance information for each of a plurality of network apparatuses connected to a network;
   a transmission unit configured to execute a transmitting process of transmitting the maintenance information collected by said collecting unit to a predetermined server apparatus on the network;
   a determination unit configured to determine, from among the plurality of network apparatuses, a substitute apparatus configured to execute, instead of the information collecting apparatus, the collecting process and the transmitting process based on the maintenance information collected by said collecting unit;
   a first requesting unit configured to request, in a case where said collecting unit cannot continue the collecting process, the determined substitute apparatus to execute the collecting process and the transmitting process; and
   a second requesting unit configured to, in a case where the determined substitute apparatus does not accept the request from said first requesting unit, request the plurality of network apparatuses other than the information collecting apparatus and the determined substitute apparatus to transmit their own maintenance information to the predetermined server apparatus and not via the information collecting apparatus.

2. The information collecting apparatus according to claim 1, wherein:
   said determination unit determines whether or not each of the plurality of network apparatuses is configured to execute the collecting process, and
   in a case where said determination unit determines that at least one of the network apparatuses is configured to execute the collecting process, said determination unit selects the determined at least one network apparatus as the substitute apparatus based on priorities to execute the collecting process.

3. The information collecting apparatus according to claim 2, wherein the priorities are determined based on at least either of frequencies of process execution by the respective network apparatuses and rates of response thereof to requests for information collection.

4. The information collecting apparatus according to claim 1, further comprising a transfer unit configured to transfer configuration information required for the collecting process to the determined substitute apparatus.

5. The information collecting apparatus according to claim 4, wherein the configuration information transferred by said transfer unit is directed to at least one of proxy setting, address of the predetermined server apparatus, or schedule information.

6. The information collecting apparatus according to claim 1, wherein the maintenance information collected by said collecting unit is directed to at least one of counter values, log information, or specification information.

7. A method of controlling an information collecting apparatus, the method comprising:
   a collecting step of executing a collecting process of collecting maintenance information for each of a plurality of network apparatuses connected to a network using the information collecting apparatus;
   a transmitting step of executing a transmitting process of transmitting the maintenance information collected in said collecting step to a predetermined server apparatus on the network using the information collecting apparatus;
   a determining step of determining, from among the plurality of network apparatuses, a substitute apparatus that executes, instead of the information collecting apparatus, the collecting process and the transmitting process based on the maintenance information collected by the collecting step;
   a first requesting step of requesting, in a case where said collecting step cannot continue the collecting process, the determined substitute apparatus to execute the collecting process and the transmitting process; and
   a second requesting step of, in a case where the determined substitute apparatus does not accept the request made in said first requesting step, requesting the plurality of network apparatuses other than the information collecting apparatus and the determined substitute apparatus to transmit their own maintenance information to the predetermined server apparatus, and not via the information collecting apparatus.

8. The method according to claim 7, wherein:
   said determining step includes determining whether or not each of the plurality of network apparatuses is configured to execute the collecting process, and
   said instructing step, in a case where said determining step determines that at least one of the network apparatuses is configured to execute the collecting process, selects the determined at least one network apparatus as the substitute apparatus based on priorities to execute the collecting process.

9. The method according to claim 8, wherein the priorities are determined based on at least either of frequencies of process execution by the respective network apparatuses and rates of response thereof to requests for information collection.

10. A non-transitory computer-readable storage medium storing a computer program executable by a computer to execute a method of controlling an information collecting apparatus, wherein the method comprises:
    a collecting step of executing a collecting process of collecting maintenance information for each of a plurality of network apparatuses connected to a network;
    a transmitting step of executing a transmitting process of transmitting the maintenance information collected in said collecting step to a predetermined server apparatus on the network;
    a determining step of determining, from among the plurality of network apparatuses, a substitute apparatus that executes, instead of the information collecting apparatus, the collecting process and the transmitting process based on the maintenance information collected by the collecting step;

a first requesting step of requesting, in a case where said collecting step cannot continue the collecting process, the determined substitute apparatus to execute the collecting process and the transmitting process; and a second requesting step of, in a case where the determined substitute apparatus does not accept the request made in said first requesting step, requesting the plurality of network apparatuses other than the information collecting apparatus and the determined substitute apparatus to transmit their own maintenance information to the predetermined server apparatus, and not via the information collecting apparatus.

* * * * *